United States Patent Office 3,445,660
Patented May 20, 1969

3,445,660
METHOD FOR DETECTION OF ULTRAVIOLET RADIATION
Louis Garasi, Los Angeles, Stephen Kaye, Pasadena, and David B. Medved, Los Angeles, Calif., assignors to Electro-Optical Systems, Inc., Pasadena, Calif., a corporation of California
Filed Mar. 17, 1965, Ser. No. 440,517
Int. Cl. G01t 1/16; H01j 39/00
U.S. Cl. 250—83.3                          3 Claims In general, the present invention relates to a method of detecting ultraviolet radiation. More specifically, the present invention relates to a simple, sensitive method for detecting intermediate and far ultraviolet radiation. As used in the following discussion, the term "intermediate ultraviolet radiation" refers to radiation with wavelengths in the range of about 2000 to 3000 angstroms, while the term "far ultraviolet radiation" refers to wavelengths in the range below about 2000 angstroms and down to at least 500 angstroms.

Since the advent of the transistor and other solid state devices, extensive research and development effort has been directed to the use of such solid state devices for detection of electromagnetic radiation because of the simplicity and reliability of such devices. Thus, photodetectors have been developed which exhibit a high sensitivity to radiation in the wavelengths of about 4000 to 10,000 angstroms. For example, one commercially available photodiode has a detectivity, D*, of $2.7 \times 10^{11}$ cm. (c.p.s.)$^{1/2}$/watts at 9000 angstroms. The term "detectivity," or "D*" noted above and used in the present application is the commonly used performance figure for sensitivity for detectors. See, for example, Kruse et al., "Elements of Infrared Technology," John Wiley & Sons, Inc., pp. 268-272 (1962).

However, all presently available photodetectors exhibit sharply decreased sensitivity, i.e., detectivity, when measuring ultraviolet radiation. Thus, for intermediate ultraviolet radiation the sensitivity is very low and substantially no sensitivity is indicated for far ultraviolet radiaton. A typical example of the limitations of such present photodetectors is illustrated in the data given by Williams, J. Opt. Soc. Am., vol. 52, pp. 1237-1244, November 1962. As shown in FIG. 6 of Williams, at 3000 angstroms the detectivity falls to about $2 \times 10^{10}$ cm. (c.p.s.)$^{1/2}$/watts and continues to decrease rapidly towards the far ultraviolet. Based on such data as well as other considerations, Williams concludes that such short wavelengths spectral response is close to the best that can be obtained by such solid state devices.

Consequently, an object of the present invention is a sensitive solid state detector for ultraviolet radiation.

Another object of the present invention is a silicon photodetector having a detectivity above about $1 \times 10^{12}$ cm. (c.p.s.)$^{1/2}$/watts with respect to radiation below about 3000 angstroms.

Still another object of the present invention is a method of detecting ultraviolet radiation in the range below about 3000 angstroms with a detectivity above about $1 \times 10^{12}$ cm. (c.p.s.)$^{1/2}$/watts.

Other objects and advantages of the present invention will be readily apparent from the following description and drawings which illustrate a preferred exemplary embodiment of the present invention.

In general, the present invention involves a method of detecting ultraviolet radiation by forming a body of silicon having a resitivity of about 1 to 50 ohm-cm., a light receiving surface, and containing adjacent zones of p-type and n-type conductivity forminy a p-n junction spaced less than about 0.5 micron from said light receiving surface. Such light receiving surface is then exposed to ultraviolet radiation and the photoresponse of said body to said radiation is measured.

In order to facilitate understanding of the present invention, reference will now be made to the appended drawings of a preferred specific embodiment of the present invention. Such drawings should not be construed as limiting the invention, which is properly set forth in the appended claims.

Figure 1:
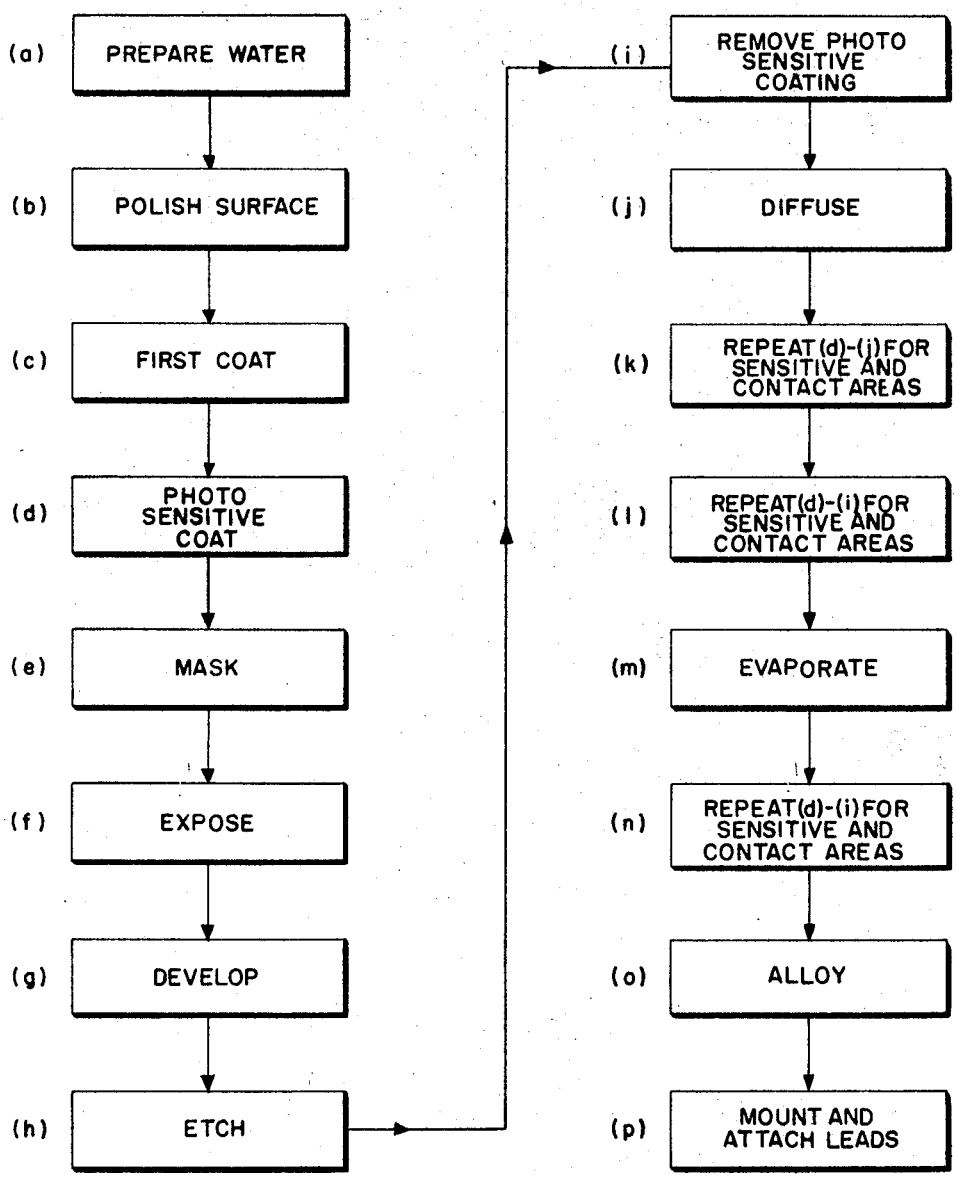
FIG. 1 is a block flow diagram of the method of forming a detector of the present invention.

As illustrated in FIG. 1, the method of making the detector of the present invention starts with a silicon wafer of about 1 inch in diameter and about 10-15 mils thick. Such wafer is commercially available in either p-type or n-type forms and with a selected resistivity. In a specific embodiment of the present invention, a p-type silicon wafer was used which was formed by doping with boron and had a resistivity in the range of about 1 to 50 ohm-cm. Initially, the surface of the wafer is polished either mechanically or with a chemical etch by methods well known to the prior art.

The next step of the present invention involves covering the polished surface with a first coating adapted to prevent penetration of a conductivity-type determining impurity during a subsequent diffusing step in the process. Specifically, an oxide coating is formed on the surface having a thickness of about 1 micron. One method of producing such coating is described by Derrick in U.S. Patent No. 2,802,760, issued August 13, 1957. Next, such first coating is covered with a photosensitive coating adapted to protect the wafer surface during a subsequent etching step after the photosensitive coating is exposed and developed. An example of such material which may be used for such photosensitive coating is Kodak Photoresist (KPR), produced by the Eastman Kodak Company, Rochester, N.Y., and it is applied by well known techniques.

Figure 2:
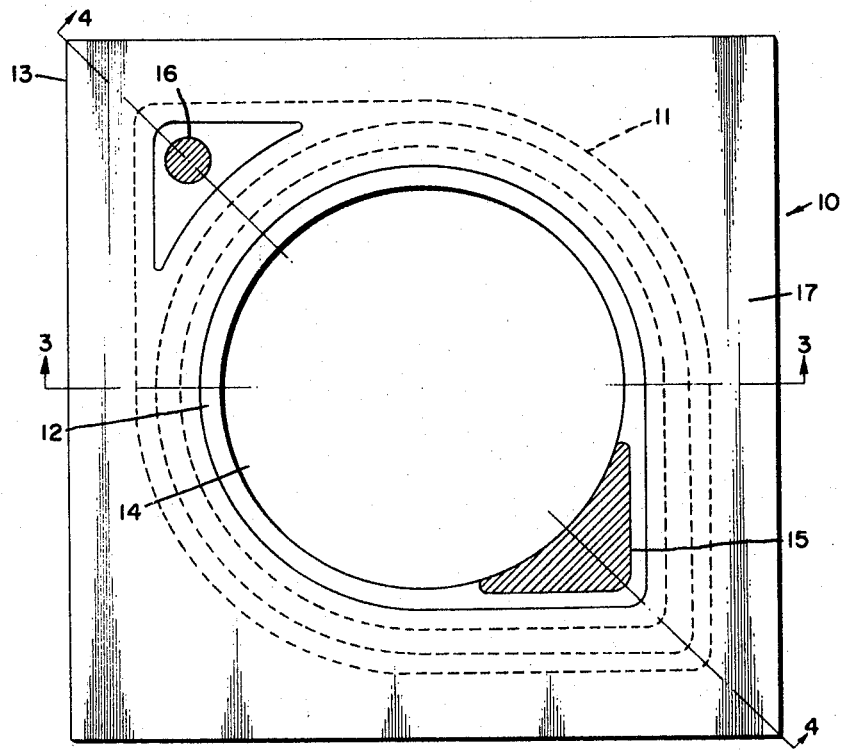
FIG. 2 is a plan view of the detector formed by the process illustrated in FIG. 1.
Figure 3:
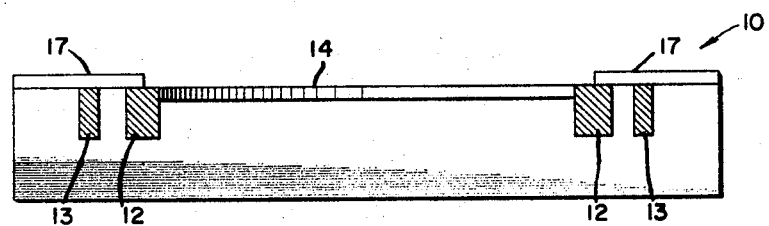
FIG. 3 is a cross sectional view of FIG. 2 taken along the lines 3—3 of FIG. 2.
Figure 4:
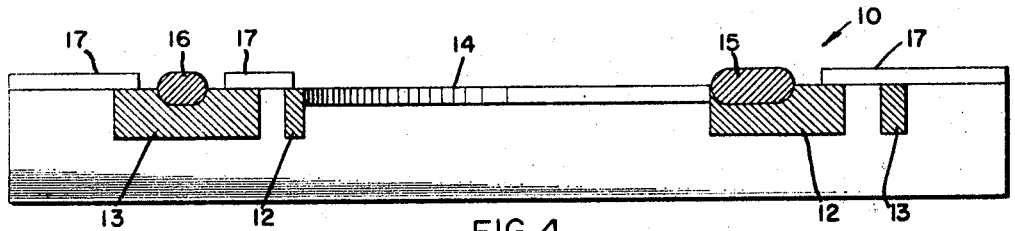
FIG. 4 is a cross sectional view of FIG. 2 taken along the lines 4—4 of FIG. 2.

Next, the coated surface is covered with a transparent photographic mask having an array of opaque patterns thereon corresponding to the contact and guard ring areas shown in FIGS. 2-4. The masked, coated surface is then exposed to an activating light such as ultraviolet light utilizing well known techniques. Next, the exposed coated surface is developed to remove the photosensitive coating from the wafer surface portions protected by the opaque patterns. Such development step is again a well known technique and may be done by using a solution such as Kodak Photoresist Developer, sold by Eastman Kodak Co., Rochester, N.Y. The wafer surface is then etched by well known techniques to remove the first coating from the surface portions exposed by the development step. Next, the remainder of the photosensitive coating is removed by conventional techniques. Next, an n-type impurity, specifically, phosphorus, is diffused into the exposed portion of the silicon by well known techniques to a depth of about 2.5 microns. Thus, the wafer is placed in a diffusion furnace containing the phosphorus and heated to vapor diffuse the phosphorus into the silicon body. A substantially planar region is produced extending from the top surface of the wafer with the depth of the penetration of the phosphorus being a function of the time and temperature of the diffusion. Specifically, to achieve the 2.5 microns depth, a wafer is placed in the diffusion furnace for 60 minutes at a temperature of 1050° C.

Then, the steps starting with the photosensitive coating step are repeated using a mask having opaque patterns for the photosensitive area and the contact area shown in FIGS. 2–4. However, the diffusion step involves the diffusion of n-type impurity, phosphorus, to a depth of less than 0.5 micron. To achieve such depth, the wafer is heated in tthe diffusion furnace for 30 minutes at a temperature of about 930° C. Next, the same sequence of steps from the photosensitive coating to the removal of the photosensitive coating are repeated to remove the oxide coating generated by the diffusion step. Then a coating of a metal such as aluminum is evaporated onto the photosensitive and contact areas. Next, the sequence of steps from the photosensitive coating step to the removal of the photosensitive coating step are repeated with a photoresist mask having an opaque pattern corresponding to the photosensitive area to remove the aluminum deposited thereon. The aluminum coating on the contact areas is then alloyed with the silicon body to provide an ohmic contact therewith. Finally, the detector is mounted on a support which includes a layer of metal such as gold to provide the ohmic contact with the back of the detector.

A specific silicon photodetector utilized in the method of the present invention and constructed in accordance with the foregoing procedures is illustrated in FIGS 2–4. As shown, the photodetector 10 involves a body of silicon 11 which is a portion of a larger body of silicon on which is formed concurrently a plurality of the silicon photodetectors utilized in the method of the present invention. The silicon body 11 is of p-type conductivity formed by boron doping and has the resistivity in the range of 1 to 50 ohm-cm. Diffused into the upper surface of the silicon body 11 is a contact area 12, a guard ring area 13, and a photosensitive area 14. The contact area 12 is adapted to permit ohmic contact with the photosensitive area 14 of the detector 10 with leads (not shown). The guard ring area 13 is a known technique for reducing the surface leakage from the photosensitive area 14. The contact area 12 and photosensitive area 14 are electrically connected to a lead (not shown) through the metallized connecting area 15 formed by the evaporative deposition of aluminum and its subsequent alloying with the silicon body. Similarly, the guard ring area 13 is connected to a lead (not shown) through a connecting area 16 also formed by the metallic deposition and alloying of aluminum with the silicon in the guard ring area. Covering the surface of the detector 10, except for the connecting areas 15 and 16 and the photosensitive area 14, is an oxide coating 17 formed during the processing of the detector 10, e.g., the formation of the first coating step set forth above.

When a silicon diode constructed as illustrated in FIGS. 2–4 by the method outlined in FIG. 1 is exposed to ultraviolet radiation on the photosensitive area, i.e., its light receiving surface, and the response of said body is measured at 3000 angstroms, a detectivity of $2.8 \times 10^{12}$ cm. (c.p.s.)$^{1/2}$/watts is obtained with a 5-volt bias applied to the guard ring and $0.8 \times 10^{12}$ cm. (c.p.s.)$^{1/2}$/watts is obtained with no bias on the guard ring. Similar measurements down to about 5000 angstroms show substantially the same detectivity over the entire range. In other words, the method of the present invention exhibits substantially the same sensitivity over the range from 3000 angstroms down to at least 500 angstroms.

Many other specific embodiments of the present invention will be obvious to one skilled in the art in view of this disclosure. For example, the detectors of the present invention may be formed using n-type silicon with a p-type impurity diffused thereinto to form the photosensitive surface. Similarly, although the use of the guard ring improves the sensitivty of the detector by reducing noise, such guard ring may be eliminated if desired.

There are many features in the present invention which clearly show the significant advance the present invention represents over the prior art. Consequently, only a few of the more outstanding features will be pointed out to illustrate the unexpected and unusual results attained by the present invention. One feature of the present invention is a method of utilizing a silicon photodiode to detect both intermediate ultraviolet radiation and far ultraviolet radiation. Still another feature of the present invention is a sensitive method of detecting ultraviolet radiation below about 3000 angstroms having a detectivity above about $1 \times 10^{12}$ cm. (c.p.s.)$^{1/2}$/watts. Still another feature of the present invention is a method of detecting ultraviolet radiation by utilizing a silicon photodiode having a resistivity in the range of about 1 to 50 ohm-cm. with a shallow p-n junction spaced less than about 0.5 micron from its light receiving surface to get a high ultraviolet sensitivity contrary to the experience of the prior art.

It will be understood that the foregoing description and examples are only illustrative of the present invention, and it is not intended that the invention be limited thereto. All substitutions, modifications, or alterations of the present invention which come within the scope of the following claims or to which the present invention is readily susceptible without departing from the spirit and scope of this disclosure are considered part of the present invention.

We claim:

1. A simple, sensitive method of detecting ultraviolet radiation in the range of about 500 to 3000 angstroms comprising:
    (a) providing a body of silicon having a resistivity of about 1 to 50 ohm-cm., a light receiving surface, and containing adjacent zones of p-type and n-type conductivity forming a p-n junction spaced less than about 0.5 micron from said light receiving surface;
    (b) exposing said light receiving surafce to the ultraviolet radiation; and,
    (c) measuring the photoresponse of said body to said radiation.

2. A method as stated in claim 1 wherein the ultraviolet radiation being measured is in the range of about 2000 to 3000 angstroms.

3. The method as stated in claim 1 wherein the ultraviolet radiation being measured is in the range of about 500 to 2000 angstroms.

References Cited

UNITED STATES PATENTS 3,351,493    11/1967    Weiman et al. _____ 317—235

RALPH G. NILSON, *Primary Examiner.*

A. B. CROFT, *Assistant Examiner.*